(12) United States Patent
Chang et al.

(10) Patent No.: US 9,676,289 B2
(45) Date of Patent: Jun. 13, 2017

(54) SYSTEM AND METHOD FOR ADJUSTING BATTERY PACK STATE OF CHARGE THRESHOLDS

(71) Applicant: Ford Global Technologies, LLC, Dearborn, MI (US)

(72) Inventors: Xiaoguang Chang, Northville, MI (US); Chuan He, Northville, MI (US); Xu Wang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 14/052,649

(22) Filed: Oct. 11, 2013

(65) Prior Publication Data

US 2015/0105948 A1 Apr. 16, 2015

(51) Int. Cl.
*B60L 11/18* (2006.01)
*B60L 1/00* (2006.01)
(Continued)

(52) U.S. Cl.
CPC ........... *B60L 11/1862* (2013.01); *B60L 1/003* (2013.01); *B60L 1/02* (2013.01); *B60L 3/0046* (2013.01);
(Continued)

(58) Field of Classification Search
CPC ........... B60L 15/2045; B60L 2240/642; B60L 2240/647; B60L 2240/545; B60L 2240/645; B60L 11/1851; B60L 2260/52; B60L 2260/54; B60L 2240/64; B60L 11/1862; B60L 15/2009; B60L 15/20; B60L 11/1879; B60L 15/2018; B60L 11/1877; B60L 1/003; B60L 1/02; B60L 3/0046; B60L 3/102; B60L 7/12; B60L 11/126; B60L 11/1805; B60L 11/1857; B60L 11/1874; B60L 11/1875; B60L 2250/28; B60L 2240/465; B60L 2240/423; B60L 2240/421; B60L 2240/12; B60L 2260/56; B60L 11/187; B60L 2240/80; B60L 2240/547; Y02T 10/7283; Y02T 10/7291;
(Continued)

(56) References Cited

U.S. PATENT DOCUMENTS 4,876,513 A 10/1989 Brilmyer et al.
5,778,326 A 7/1998 Moroto et al.
(Continued)

OTHER PUBLICATIONS

Chang, Xiaoguang et al., "Systems and Method for Adjusting Battery Pack State of Charge Limits," U.S. Appl. No. 14/052,645, filed Oct. 11, 2013, 37 pages.
(Continued)

*Primary Examiner* — Jason Holloway
(74) *Attorney, Agent, or Firm* — David Kelley; McCoy Russell LLP (57) ABSTRACT

Systems and methods for operating a battery pack supplying power to propel a vehicle are disclosed. One example method includes, increasing a battery pack state of charge window in response to a negative grade of a section of road a vehicle is traveling. The method also includes decreasing the battery pack state of charge window in response to the vehicle transitioning from traveling down a section of road having a negative grade to traveling down a section of road that has a positive or zero grade.

10 Claims, 8 Drawing Sheets

(51) Int. Cl.
*B60L 1/02* (2006.01)
*B60L 3/00* (2006.01)
*B60L 3/10* (2006.01)
*B60L 7/12* (2006.01)
*B60L 11/12* (2006.01)
*B60L 15/20* (2006.01)

(52) U.S. Cl.
CPC ............... *B60L 3/102* (2013.01); *B60L 7/12* (2013.01); *B60L 11/126* (2013.01); *B60L 11/1805* (2013.01); *B60L 11/187* (2013.01); *B60L 11/1857* (2013.01); *B60L 11/1874* (2013.01); *B60L 11/1875* (2013.01); *B60L 11/1877* (2013.01); *B60L 11/1879* (2013.01); *B60L 15/20* (2013.01); *B60L 15/2009* (2013.01); *B60L 15/2018* (2013.01); *B60L 2240/12* (2013.01); *B60L 2240/421* (2013.01); *B60L 2240/423* (2013.01); *B60L 2240/465* (2013.01); *B60L 2240/545* (2013.01); *B60L 2240/547* (2013.01); *B60L 2240/642* (2013.01); *B60L 2240/647* (2013.01); *B60L 2240/80* (2013.01); *B60L 2250/28* (2013.01); *B60L 2260/56* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y02T 10/7291* (2013.01); *Y02T 90/16* (2013.01)

(58) Field of Classification Search
CPC . Y02T 10/7044; Y02T 10/7275; Y02T 10/72; Y02T 90/16; Y02T 10/705; Y02T 10/7005; Y02T 10/7077; Y02T 10/645; Y02T 90/161; Y02T 10/6217; B60W 2510/244; B60W 2550/402; B60W 2550/143
See application file for complete search history.

(56) References Cited

U.S. PATENT DOCUMENTS

| | | | |
|---|---|---|---|
| 6,487,477 B1* | 11/2002 | Woestman et al. | 701/22 |
| 7,463,958 B2 | 12/2008 | Suzuki | |
| 7,622,897 B2* | 11/2009 | Eberhard et al. | 320/150 |
| 7,934,573 B2 | 5/2011 | Fassnacht | |
| 8,138,720 B2 | 3/2012 | Snyder et al. | |
| 8,725,331 B2* | 5/2014 | Yoshida | 701/22 |
| 2006/0246329 A1 | 11/2006 | Gopal et al. | |
| 2007/0112475 A1* | 5/2007 | Koebler et al. | 701/1 |
| 2009/0167254 A1* | 7/2009 | Eberhard et al. | 320/152 |
| 2012/0053771 A1* | 3/2012 | Yoshida | 701/22 |
| 2013/0274971 A1* | 10/2013 | Takahashi | 701/22 |
| 2014/0116793 A1* | 5/2014 | Pelletier et al. | 180/65.225 |

OTHER PUBLICATIONS

Anonymous, "Device and Method to Completely Discharge an ElectroChemical Energy Storage System," IPCOM No. 000153217, Published May 29, 2007, 3 pages.

* cited by examiner

SYSTEM AND METHOD FOR ADJUSTING BATTERY PACK STATE OF CHARGE THRESHOLDS

TECHNICAL FIELD

The present application relates to operating a battery pack supplying power to a vehicle.

BACKGROUND AND SUMMARY

Hybrid vehicles and electric vehicles may be powered via a battery pack. Battery packs have a rated capacity that may be expressed in ampere-hours, or energy that may be expressed in watt-hours. If the battery is partially or fully discharged, the battery is storing less than its rated capacity. Battery state of charge (SOC) is one way of expressing the amount of charge stored in the battery relative to the rated battery capacity. For example, if a battery has a capacity of 1000 ampere-hours, the battery has 500 ampere-hours of charge when the battery is at fifty percent SOC.

Battery SOC may also be a basis for determining whether or not a battery may be charged or discharged. If a battery is charged more than a threshold amount, battery degradation may occur. Likewise, if a battery is discharged more than a threshold amount, battery degradation may occur. Therefore, battery charging and/or discharging may be limited to a range or window of battery SOC to reduce the possibility of battery degradation. For example, during nominal operating conditions a battery may be charged to a SOC value of seventy (e.g., seventy percent of rated capacity) and discharged to a SOC value of thirty (e.g., thirty percent of rated capacity). However, restricting or limiting SOC to a specific range or window may reduce an amount of time a vehicle is in a regeneration mode where a vehicle's kinetic energy is stored in the battery for use at a later time. Consequently, the vehicle may have to transition between electric braking and mechanical braking. Further, the vehicle's travel range may be less than is desired after the battery is charged during regenerative braking since battery charging is limited.

The inventors herein have recognized the above-mentioned issues and have developed a system for operating a battery pack of a vehicle, comprising: a vehicle including a battery pack; and a controller including non-transitory instructions for adjusting battery pack charging amount in response to the vehicle traveling on a section of road having a negative grade.

By adjusting a battery pack charging amount in response to a vehicle traveling a section of road having a negative grade or downhill, it may be possible to provide the technical result of extending a range the vehicle travels on electrical energy. Further, the battery pack charging amount may be decreased in response to the vehicle transitioning from traveling a section of road having a negative grade to a section of road having a positive or zero grade. The battery pack charging amount and battery pack rate of charge may be adjusted via increasing and/or decreasing a battery pack state of charge window. The battery pack state of charge window limits the amount of charge supplied to a battery and the rate of charge that may be supplied to the battery.

The present description may provide several advantages. Specifically, the approach may improve vehicle travel distance. Further, the approach may increase battery pack charging for limited durations without degrading battery life. Additionally, the approach may allow the vehicle to operate for longer periods of time while providing regenerative braking.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
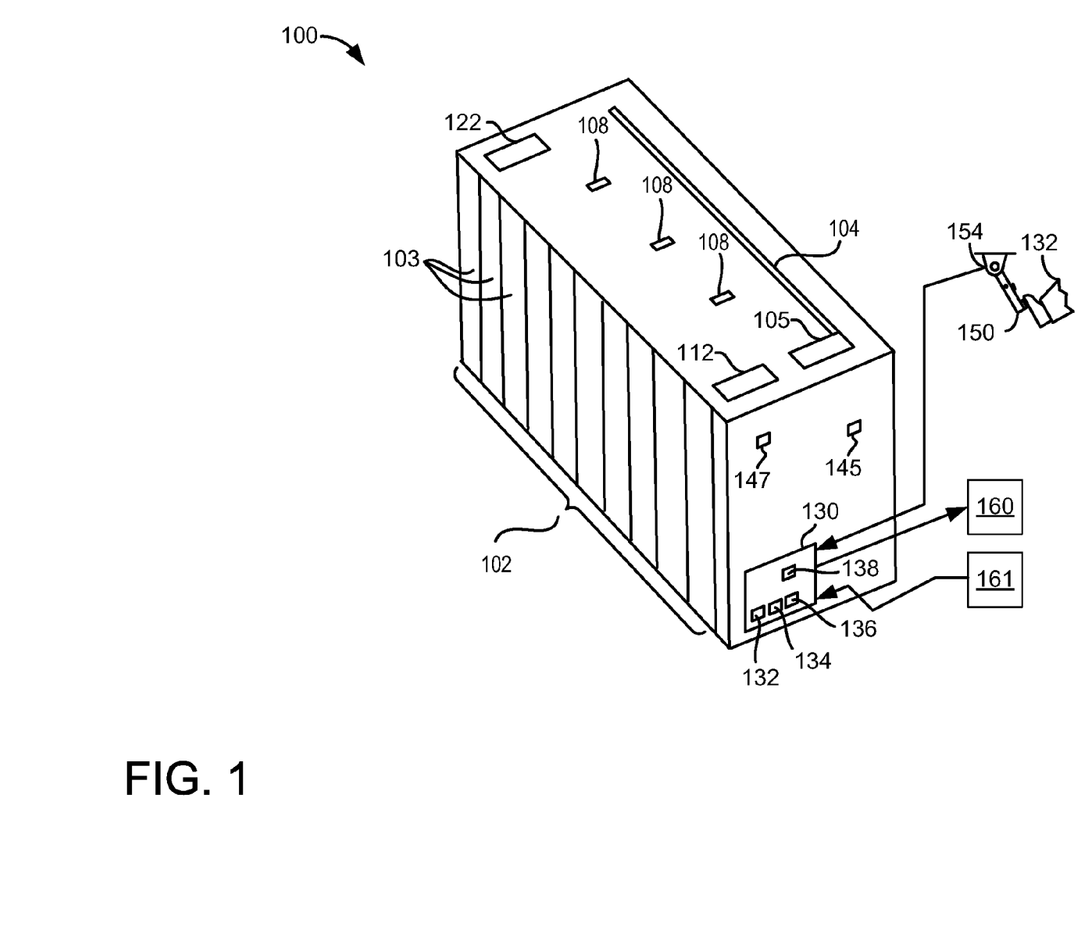
FIG. 1 shows a schematic view of a vehicle battery pack.
Figure 2:
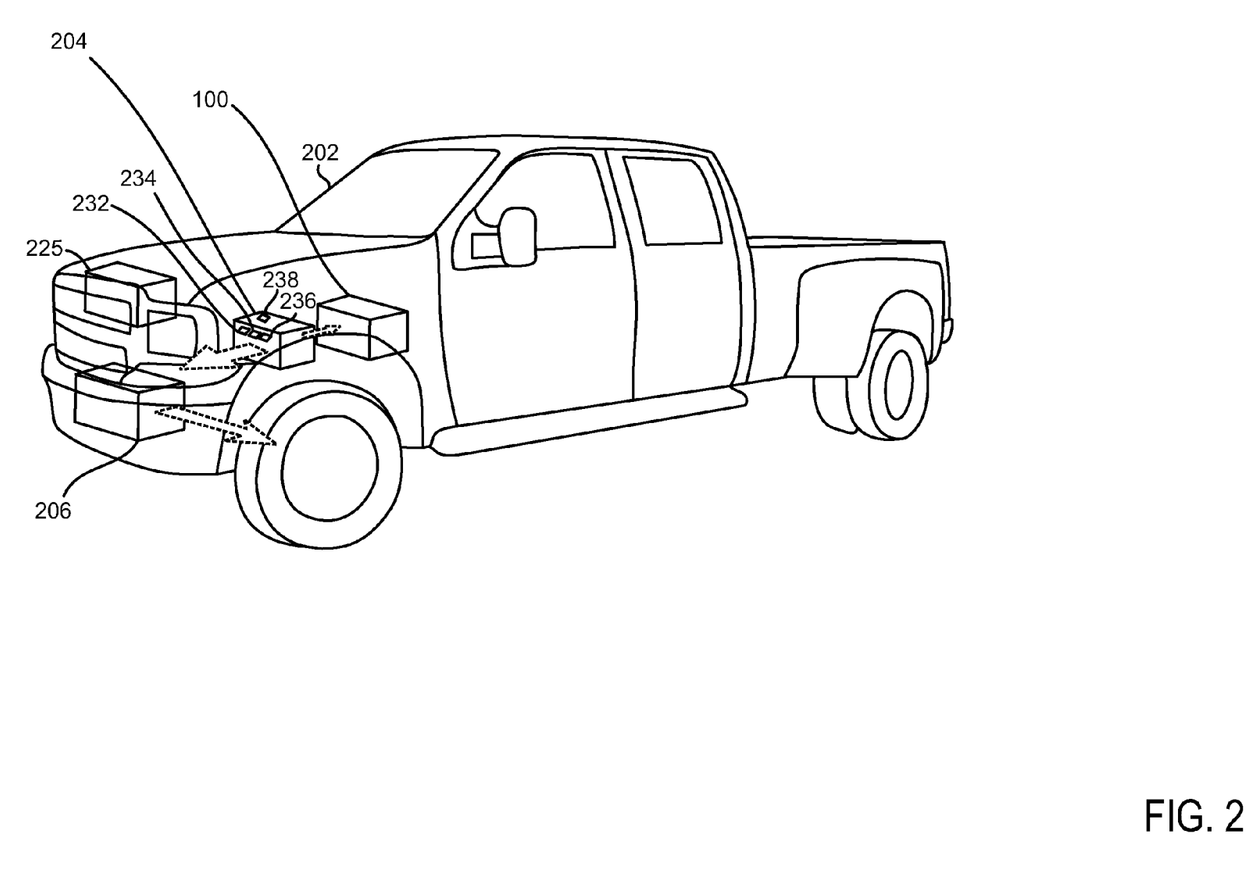
FIG. 2 shows a schematic view of a vehicle battery pack in a vehicle.
Figure 7A:
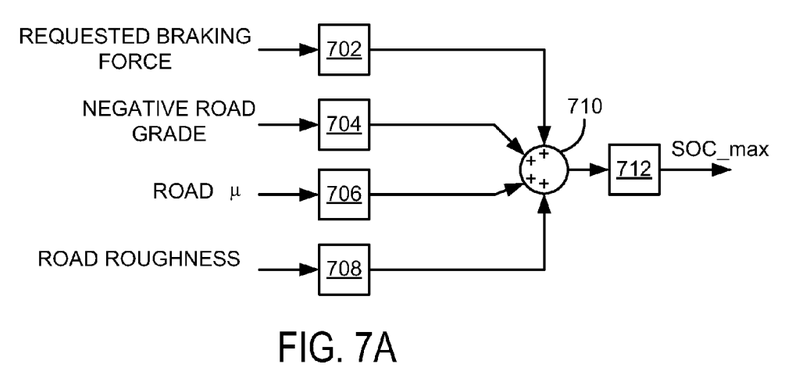
FIGS. 7A-7B show block diagrams of a second method for increasing SOC window limits.

The present description is related to adjusting battery pack SOC window limits (e.g., operating thresholds) in response to a vehicle traveling downhill on a road having a negative grade. A battery pack for supplying propulsion power to a vehicle is shown in FIG. 1. The battery pack may supply electrical power to propel a vehicle as is shown in FIG. 2. The battery pack may operate according to the operating sequence shown in FIG. 3. A flowchart for operating a battery pack in a vehicle traveling downhill on a road with a negative grade is shown in FIG. 4. The battery pack SOC limits may be adjusted according to the block diagrams and plots shown in FIGS. 5-8. FIG. 9 shows an example plot of adjusting SOC window limits.

Referring now to FIG. 1, an example battery pack 100 is illustrated. Battery pack 100 includes battery cell stack 102 comprised of a plurality of battery cells 103. Battery pack 100 may be air cooled by fan 112, or alternatively, liquid cooled via optional coolant circuit 104 and pump 105. Battery cells 103 may be lithium-ion, nickel-cadmium, or other known chemistries. Battery cells 103 may be electrically connected in series and/or parallel. Battery cells electrically connected in series increase battery pack output voltage. Battery cells electrically connected in parallel increase the battery capacity or amp-hour rating. Battery pack temperature may be sensed or measured via battery pack temperature sensors 108. In some examples, a battery temperature sensor may be supplied for each/or several battery cells 103.

Battery fan 112 and/or pump 105 may be selectively activated and deactivated in response to battery pack temperature sensors 108. Further, a speed of rotation of battery fan 112 and/or pump 105 may be varied in response to battery pack temperature sensors 108. For example, if battery pack temperature is approaching a high temperature threshold, a speed of battery fan 112 and/or pump 105 may be increased. Alternatively, if battery pack temperature is decreasing and approaching a lower temperature threshold, a speed of battery fan 112 and/or pump 105 may be reduced.

During conditions when battery pack 100 is at lower temperatures, battery pack heating elements 122 may be activated to increase the temperature of battery pack 100. In one example, if battery temperature sensor 108 indicates a low battery temperature, heating elements 122 are activated to increase battery temperature so that battery efficiency may be increased.

Battery pack 100 also includes a battery controller 130 including inputs and outputs 132. Battery controller 130 also includes non-transitory memory or read-only memory 134 for storing executable instructions. Battery controller 130 also includes volatile memory 136 for storing variables and instructions. Battery controller 130 also includes a central processing unit 138 that is in electrical communication with volatile memory 136, read-only memory 134, and inputs and outputs 132. Inputs and outputs 132 are in electrical communication with battery pack sensors and actuators (e.g., temperature sensor 108). Battery controller 130 is in electrical communication with user display or light 160 for indicating battery pack degradation. Battery controller 130 may also limit battery pack output power via limiting current through current limiting device 145 (e.g., transistor, thyristor, FET, MOSFET, etc.). Battery controller 130 may also communicate with other vehicle controllers such as powertrain controllers, propulsion motor controllers, transmission controllers, etc. The battery controller may communicate SOC limits to other controllers to limit battery output power via limiting battery charging and/or discharging.

Battery pack 100 may also include an inclinometer 147 for determining road grade. Alternatively, battery pack 100 may receive road information (e.g., grade) from a global positioning system or a vehicle controller. In some examples, battery pack 100 may interface with a global positioning navigation system 161 via CAN bus or other interface.

Battery pack 100 may also include an input for brake pedal position from brake pedal sensor 154. Brake pedal sensor 154 provides an output that is proportional to the position of brake pedal 150. The position of brake pedal 150 may be adjusted via foot 132. In other examples, a vehicle controller may provide vehicle braking force data to battery pack 100.

Referring now to FIG. 2, an example vehicle 202 in which battery pack 100 may be included is shown. Vehicle 202 may include a motor 206 to propel vehicle 202 and a vehicle controller 204. Vehicle controller 204 controls motor 206 in response to vehicle conditions and driver demand torque. Motor 206 is supplied electrical power via battery pack 100. In some examples, vehicle controller 204 may control both motor 206 and an optional internal combustion engine 225.

Vehicle controller 204 also includes including inputs and outputs 232. Vehicle controller 204 also includes non-transitory memory or read-only memory 234 for storing executable instructions. Vehicle controller 230 also includes volatile memory 236 for storing variables and instructions. Vehicle controller 230 also includes a central processing unit 238 that is in electrical communication with volatile memory 236, read-only memory 234, and inputs and outputs 232. Inputs and outputs 232 are in electrical communication with battery pack controller 130 via a CAN bus, for example.

Thus, the system of FIGS. 1 and 2 provides for operating a battery pack of a vehicle, comprising: a vehicle including a battery pack; and a controller including non-transitory instructions for adjusting battery pack charging amount in response to the vehicle traveling on a section of road having a negative grade. The system further comprises additional instructions for adjusting a rate of battery pack charging in response to the vehicle traveling on the road having the negative grade.

In some examples, the system includes where adjusting the rate of battery pack charging includes increasing a battery pack charging amount for an increased battery state of charge amount. The system includes where adjusting battery pack charging amount includes increasing a battery pack charging amount. The system further comprises additional instructions for decreasing the battery pack charging amount in response to a positive or zero road grade. The system further comprises additional instructions for adjusting the battery pack charging amount in response to a battery temperature. The system includes where the controller is a battery pack controller. The system further comprises additional instructions for communicating a battery state of charge window that varies in response to the vehicle traveling on the road having a negative grade to a vehicle controller.

In another example, the system of FIGS. 1 and 2 provides for operating a battery pack of a vehicle, comprising: a vehicle including a battery pack; and a controller including non-transitory instructions for varying battery pack charging amount in response to a grade amount of a section of a road the vehicle is traveling. The system further comprises additional instructions to limit a rate of change in the battery pack charging amount. The system further comprises additional instructions to limit a rate of change in a battery pack charging rate. The system includes where the grade amount is based on output of a global positioning system. The system further comprises additional instructions for communicating the battery pack charging amount to a vehicle controller. The system further comprises additional instructions to reduce the battery pack charging amount in response to the vehicle traveling a road with a positive or zero grade.

Figure 3:
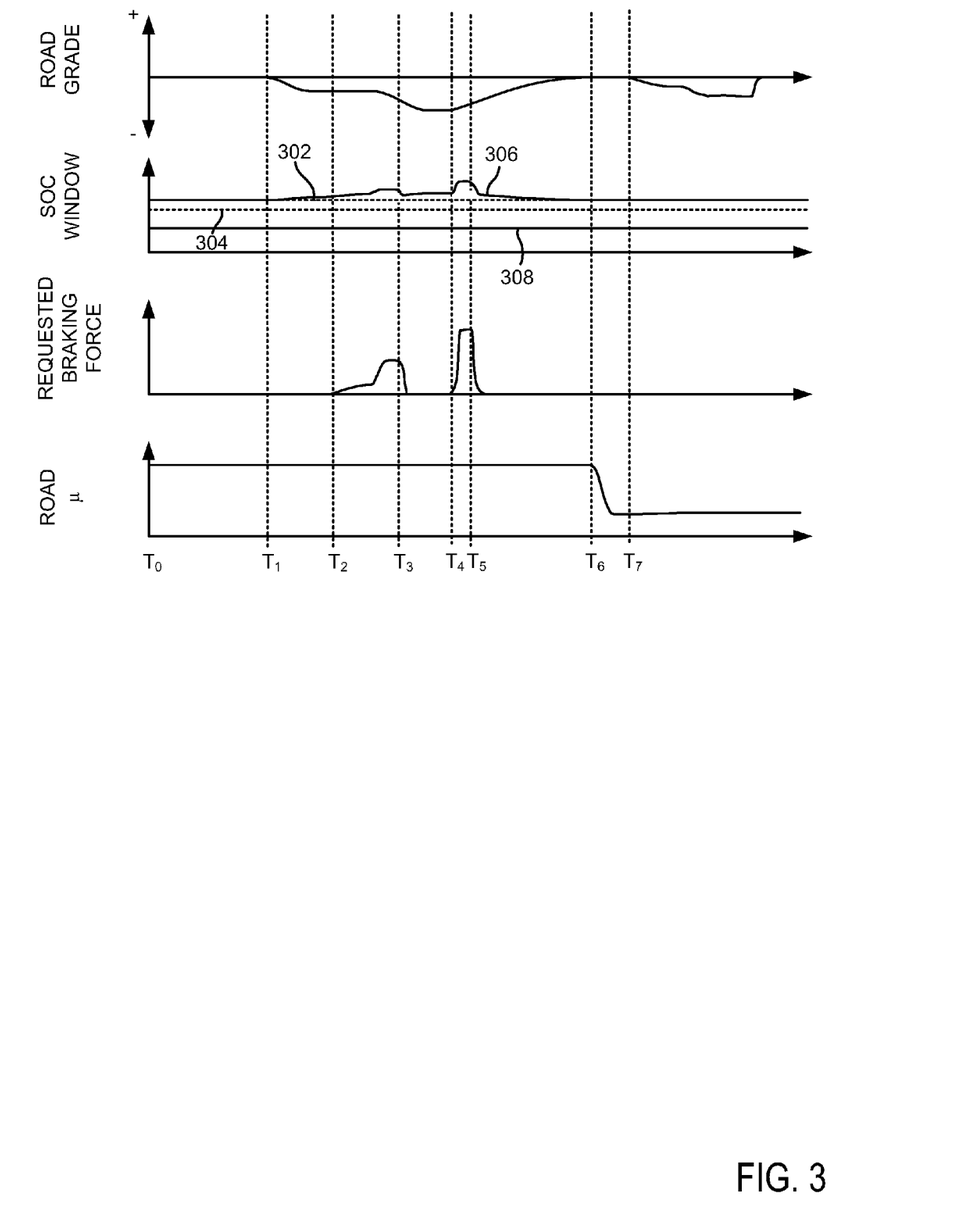
FIG. 3 shows an example battery pack operating sequence.
Figure 4:
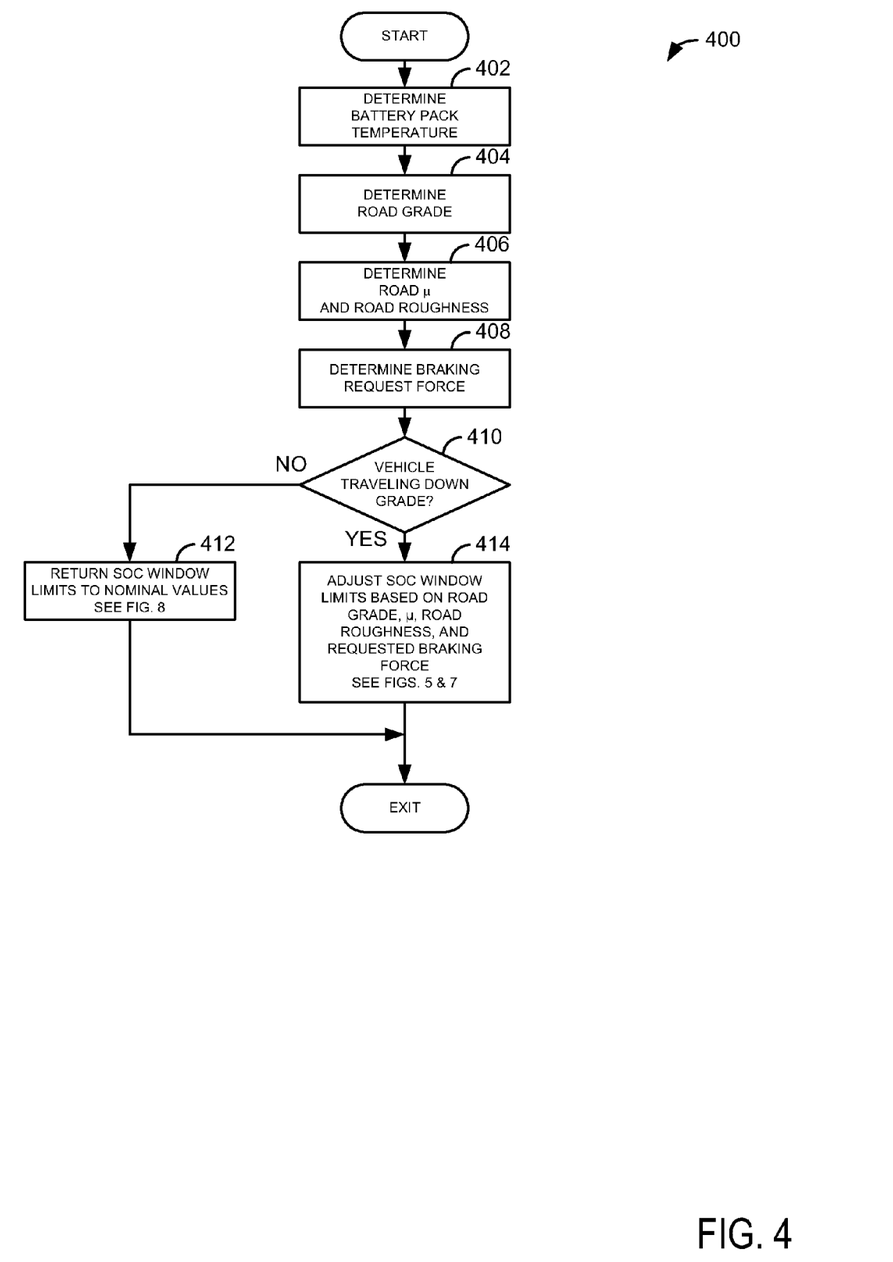
FIG. 4 shows a method for operating a battery pack.

Turning now to FIG. 3, an example prophetic battery pack operating sequence is shown. The battery operating sequence of FIG. 3 may be provided by the system shown in FIGS. 1 and 2. Further, the battery operating sequence may be the output of the method of FIG. 4. FIG. 3 includes vertical markers T0-T7 that show times of particular interest in the sequence.

The first plot from the top of FIG. 3 is a plot of road grade of a road the vehicle in which the battery pack is located is traveling. The X axis represents time and time increases from the left to right side of FIG. 3. The Y axis represents road grade. Road grade values above the X axis are positive indicting that the vehicle is traveling uphill. Road grade values below the X axis are negative indicating that the vehicle is traveling downhill. The road gets steeper in the direction of the Y axis arrows.

The second plot from the top of FIG. 3 is a plot of battery pack SOC window limits. The X axis represents time and time increases from the left to right side of FIG. 3. The Y axis represents the battery pack SOC level. Dashed line 302 represents a baseline or nominal SOC_high (e.g., SOC when on a smooth, flat, high friction road at 20° C.) which is the highest SOC point that battery pack is allowed to operation at full charge power, and dashed line 304 represents a SOC of 50%. SOC_low for baseline nominal conditions is at the same level as SOC_low for the illustrated conditions which is shown as solid line 308. SOC_low is the lowest SOC value that is allowed the battery pack to operate at full discharge power.

Solid line 306 represents SOC_high based on the illustrated conditions. The variable SOC_max (not shown) is adjusted above SOC_high, and SOC_min (not shown) is adjusted below SOC_low. SOC_max is the maximum SOC value that battery pack is allowed to be charged, and available battery pack charge power is zero at SOC_max. SOC_min is the minimum value that the battery pack is allowed to be discharged, and available battery pack discharge power is zero at SOC_min. SOC_max and SOC_min are not shown in FIG. 3 to improve interpretability of the plot; however, SOC_max may follow the same trends as SOC_high. FIG. 9 provides a visual reference for SOC_max and SOC_high.

The third plot from the top of FIG. 3 is a plot of requested vehicle braking force versus time. The X axis represents time and time increases from the left to right side of FIG. 3. The Y axis represents requested vehicle braking force and vehicle braking force increases as the driver depresses a brake pedal further. In this example, requested braking force increases in the direction of the Y axis arrow.

The fourth plot from the top of FIG. 3 is a plot of coefficient of friction $\mu$ for the road the vehicle is traveling versus time. The X axis represents time and time increases from the left to right side of FIG. 3. The Y axis represents coefficient of friction $\mu$ for the road the vehicle is traveling and coefficient of friction $\mu$ increases in the direction of the Y axis arrow. A higher coefficient of friction indicates higher friction between the road and vehicle tires. A lower coefficient of friction indicates lower friction between the road and vehicle tires.

At time T0, the vehicle is traveling on a road with zero grade (e.g., a flat road). The SOC window limits SOC_high 306 and SOC_low 308 are constant levels above and below 50% SOC marker 304. The requested braking force is zero in response to the brake pedal not being applied. The road the vehicle is traveling has a high coefficient of friction $\mu$ indicating there is good fraction between vehicle wheels and the road.

At time T1, the road grade begins to go negative to indicate that the vehicle is traveling downhill. The SOC_high begins to increase to allow the battery pack to take on additional charge and to increase the charging power when the battery is at a higher level SOC. The requested braking force remains at zero and the road $\mu$ is at a higher level.

At time T2, the driver applies the vehicle brake (not shown) and the requested braking force increases in response to the driver applying the vehicle brakes. The SOC_high increases further in response to both the negative road grade and the application of vehicle brakes (e.g., the increase in requested braking force). By increasing the SOC_high additional charge may be stored in the battery so that the vehicle may stay in a regenerative braking mode for a longer amount of time. Further, SOC_high may be increased proportionately with the increase in requested braking force so that during quick stops on a downhill or negative grade additional electrical power may be stored to the battery pack. The road coefficient of friction remains at a constant level.

At time T3, the driver releases the vehicle brake pedal and the requested vehicle braking force decreases in response to the released brake pedal. The SOC_high decreases in response to the decrease in vehicle braking force. Decreasing the SOC_high in response to decreased requested braking force may conserve a portion of battery charge capacity for quick braking conditions on downhill or negative grade roads. The road coefficient of friction remains at a constant level.

At time T4, the driver applies the vehicle brakes for a second time. The SOC_high is increased in response to the increased vehicle brake force request. Further, the SOC_high value is also increased based on the vehicle traveling on a road having a negative grade. The road coefficient of friction remains at a constant level.

At time T5, the driver releases the vehicle brake for a second time and the requested braking force is reduced in response to the brake pedal being released. The SOC_max is reduced in response to the reduction in requested braking force. The road coefficient of friction remains at a constant level.

At time T6, the road coefficient of friction transitions to a lower level in response to the road coefficient of friction being reduced. The road coefficient of friction may be reduced when the road changes from a paved road to a gravel road or when ice or snow is present on the road surface. The decrease in the road coefficient of friction may make it more difficult to provide regenerative braking. Therefore, the SOC_high may be reduced in response to a reduction in road coefficient of friction. However, at time T6, SOC_high is already at the nominal or baseline level so SOC_high is not reduced further.

At time T7, the road grade changes from zero to negative. The change in road grade would cause SOC_high to increase in response to the negative road grade but for the coefficient of road friction being low. Consequently, the SOC_high value remains at the baseline or nominal level until the sequence ends.

In this way, SOC_high and SOC_max (not shown) may be adjusted in response to a vehicle traveling on a section of road that has a negative grade or downhill. Further, SOC_high may be adjusted in response to the coefficient of friction of the section of road the vehicle is traveling on and requested braking force. By adjusting SOC window limits SOC_max and SOC_high, it may be possible to allow the vehicle to stay in a regenerative braking mode for a longer period of time or travel distance. Further, by adjusting the SOC window limits, it may be possible for the battery pack to accept higher amounts of charging power when the battery pack is at higher SOC levels.

Referring now to FIG. 4, a method for operating a battery pack in a vehicle is shown. The method of FIG. 4 may be stored in non-transitory memory of a controller as executable instructions in a system as is shown in FIGS. 1 and 2. Further, the method of FIG. 4 may provide and operating sequence as is shown in FIG. 3.

At 402, method 400 determines battery pack temperature. Battery pack temperature may be determined via one or more battery pack temperature sensors. Alternatively, battery pack temperature may be inferred or estimated. Method 400 proceeds to 404 after battery pack temperature is determined.

At 404, method 400 determines road grade. In one example, method 400 determines road grade from output of an inclinometer. Alternatively, method 400 may receive road grade from a vehicle controller or a global positioning satellite system. Method 400 proceeds to 406 after road grade is determined.

At 406, method 400 determines a road surface coefficient of friction μ and road roughness. In one example, the road surface coefficient of friction is determined via wheel slip during acceleration and/or deceleration. An increased amount of wheel slip indicates a lower coefficient of friction for the road. Road roughness may be assigned a value from 0 to 1 based on changes in vehicle suspension movement over a specified time interval and vehicle speed. A flat road may be assigned a value of zero while a very rough road may be assigned a value of one. Method 400 proceeds to 408 after road roughness and road coefficient of friction are determined.

At 408, method 400 determines an amount of a braking force from a braking request. The braking request force amount corresponds to an amount of force the driver wishes to apply to slow the vehicle. The braking request force amount may be implemented via regenerative braking, mechanical braking, or a combination of mechanical braking and regenerative braking. The braking request force amount may be determined from a position of a brake pedal, or alternatively, the braking request amount may be provided to the battery controller via another controller such as a vehicle controller. Method 400 proceeds to 410 after the braking force requested amount is determined.

At 410, method 400 judges whether or not the vehicle is traveling down a section of road that is downhill or having a negative slope or grade. Method 400 may judge whether or not the vehicle is traveling downhill via a sign of a grade variable determined from an inclinometer or global positioning system. A positive sign indicates uphill while a negative sign indicates that the vehicle is traveling a section of road going downhill. If method 400 judges that the vehicle is traveling downhill on a negative grade section of road, the answer is yes and method 400 proceeds to 414. Otherwise, the answer is no and method 400 proceeds to 412.

In one alternative example of the method of FIG. 4, method 400 may increase battery energy consumption via stopping an internal combustion engine in response to approaching a section of road that has a negative grade. The electric motor may be activated before the section of road having the negative slope is encountered so that battery charge is consumed. Identifying approaching a section of road having a negative grade and anticipating traveling on the negative grade may be determined via evaluating road grades of the road the vehicle is traveling before the section of road is actually traveled upon by the vehicle having the battery pack. The road grade information may be provided via a navigation system.

At 412, method 400 returns or adjusts the battery pack SOC window limits to nominal values. Method 400 may return the SOC window limits SOC_high and SOC_max to nominal values in a variety of different ways. One way is described in the description of FIG. 8. Alternatively, SOC window limits may transition to values stored in a tables without using a controller. It may be desirable to move the SOC window limit SOC_high to just below the present value of SOC and SOC_max to just above the present value of SOC when reducing SOC window limits. Further, it may be desirable to move the SOC window limits to the nominal SOC window limits while SOC is between SOC_high and SOC_low In one example, nominal SOC window limits take on the values shown in table 1.

TABLE 1

Base_SOC_Window—SOC window for normal vehicle operation

| PackTemp | SOC_max | SOC_high | SOC_low | SOC_min |
|---|---|---|---|---|
| −40 | 64.5 | 59 | 38 | 33 |
| −30 | 67 | 61 | 38 | 33 |
| −20 | 69 | 63 | 38 | 33 |
| −10 | 70 | 65 | 38 | 33 |
| 0 | 70 | 65 | 38 | 33 |
| 10 | 70 | 65 | 38 | 33 |
| 20 | 70 | 65 | 38 | 33 |
| 30 | 72 | 67 | 38 | 33 |
| 40 | 72 | 67 | 38 | 33 |
| 50 | 70 | 62 | 38 | 33 |
| 60 | 66 | 60 | 38 | 33 |

Where PackTemp is battery pack temperature ° C., SOC_max is a maximum allowed SOC, SOC_high is a SOC value less than SOC_max that indicates SOC is near SOC_max during battery pack charging, SOC_min is a minimum allowed SOC, SOC_low is a SOC value greater than SOC_min that indicates SOC is near SOC_min during a battery pack discharging. The table entry values that are shown in table 1 are merely illustrative and they are not to be considered as limiting in any way. Baseline values may apply during flat road conditions when the road coefficient of friction is high. Method 400 proceeds to exit after SOC window limits are returned to baseline values.

Figure 5:
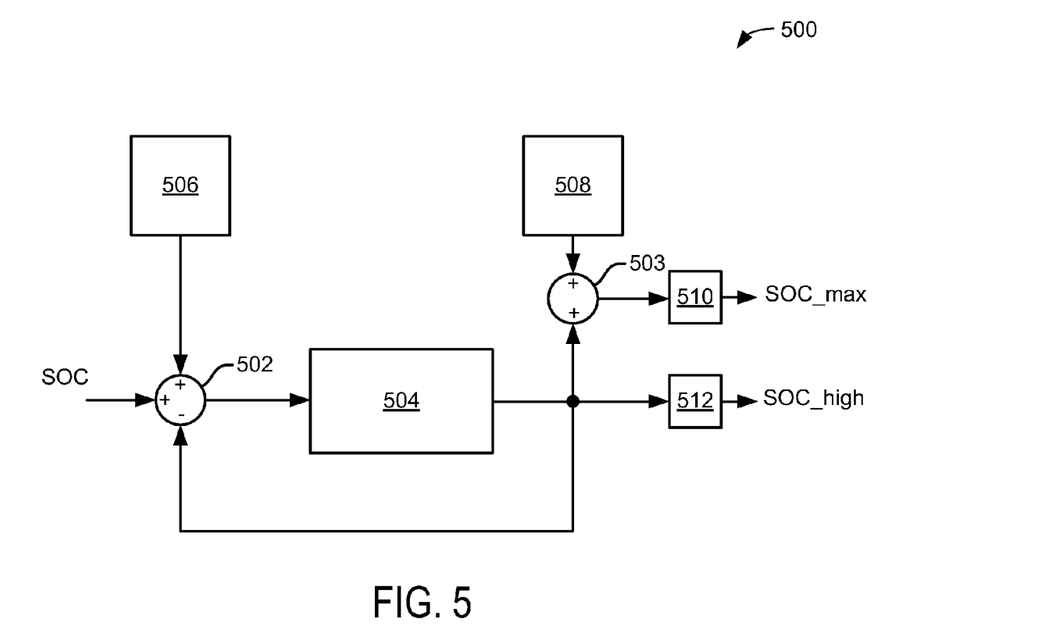
FIG. 5 shows a block diagram of a first method for increasing SOC window limits.

At 414, method 400 adjusts SOC window limits SOC_high and SOC_max based on road grade, road roughness, μ, and requested braking force. SOC window limits may be adjusted in several different ways. FIGS. 5 and 7 describe two ways method 400 may adjust SOC window limits. Alternatively, the SOC_high and SOC_max values may be directly moved from the nominal values of a SOC table to the non-nominal values of another SOC table. The SOC_high and SOC_max values may be moved at the same time to avoid the possibility of encountering a change in battery pack charging rate during regenerative braking Table 2 provides an example of SOC window limits that have been expanded in response to a negative road grade.

TABLE 2

Downhill_SOC_Window—SOC window for downhill condition

| PackTemp | SOC_max | SOC_high | SOC_low | SOC_min |
|---|---|---|---|---|
| −40 | 64.5 | 59 | 38 | 33 |
| −30 | 85 | 61 | 38 | 33 |
| −20 | 90 | 70 | 38 | 33 |
| −10 | 95 | 75 | 38 | 33 |
| 0 | 95 | 85 | 38 | 33 |
| 10 | 95 | 90 | 38 | 33 |
| 20 | 95 | 90 | 38 | 33 |
| 30 | 95 | 90 | 38 | 33 |
| 40 | 95 | 90 | 38 | 33 |
| 50 | 95 | 90 | 38 | 33 |
| 60 | 95 | 80 | 38 | 33 |

The table entry values that are shown in table 2 are merely illustrative and they are not to be considered as limiting in any way. Method 400 proceeds to exit after SOC window limits are adjusted.

Thus, the method of FIG. 4 provides for operating a battery pack, comprising: adjusting a battery pack state of charge window in response to a vehicle traveling on a section of road that has a negative grade. The method includes where the battery pack state of charge window is increased as a percentage of battery capacity in response to traveling on the section of road that has the negative grade. The method further comprises decreasing the battery pack state of charge window in response to the vehicle transitioning from traveling down the section of road that has a negative grade to the vehicle traveling down a second of road that has a positive or zero grade.

In some examples, the method includes where the battery pack state of charge window is adjusted proportionately in response to an amount of the negative grade. The method further comprises limiting a rate of change in the battery pack state of charge window. The method further comprises adjusting the battery pack state of charge window in response to an amount of a vehicle braking force request.

Referring now to FIG. 5, a block diagram 500 of a method for increasing SOC_max and SOC_high is shown. The method described by FIG. 5 may be part of the method of FIG. 4.

The present battery pack SOC is input into summing junction 502 along with a calibration scalar from 506 and feedback from the output of proportional/integral controller 504. In this example, the PI controller is a type of controller that may be applied to the method of FIG. 5; however, other types of controllers such as fuzzy controllers and nonlinear controllers may be applied as well. The calibration scalar in 506 is greater than zero. The output from proportional/integral controller 504 is routed through limiter 512. Limiter 512 provides an upper limit based on battery pack temperature to the SOC value and the output from limiter 512 is SOC_high. The output from proportional/integral controller 504 is also routed through summing junction 503 where it is added to the calibration scalar at 508. The output of summing junction 513 is directed to limiter 510. Limiter 510 provides an upper limit to the SOC value based on battery temperature and the output from limiter 510 is SOC_max. Thus, the method described by the block diagram in FIG. 5 uses the present battery pack SOC as the initial point of increasing SOC_high and SOC_max.

Figure 6:
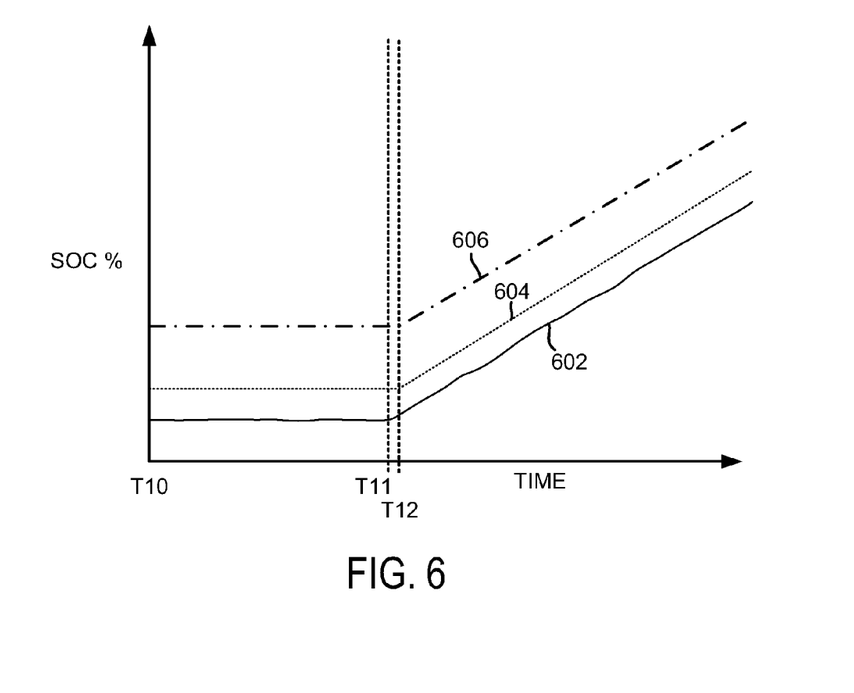
FIG. 6 shows a prophetic plot of increasing SOC window limits according to the method of block diagram 5.

Referring now to FIG. 6, an example plot of the method of FIG. 5 increasing SOC_high and SOC_max from the presents SOC is shown. The plots X axis represents time and time increases from the right side of the plot to the left side of the plot. The Y axis represents SOC and SOC increases in the direction of the Y axis arrow.

Solid line 602 represents battery pack SOC. Dashed line represents SOC_high and dash-dot line 606 represents SOC_max. At time T10, the vehicle is traveling down a flat road. At time T11, the road grade changes to a negative grade and the method of FIG. 5 is activated causing SOC_high and SOC_max to increase a short time later at time T12.

Referring now to FIG. 7A, an alternative method for increasing SOC_high in response to requested vehicle braking force, negative road grade, road μ, and road roughness is shown. A requested braking force indexes a look-up table 702 and the look-up table outputs an increase in SOC_max that is proportionate to the requested braking force when the requested braking force is increasing. Similarly, negative road grade (e.g., −3% road grade) or road angle indexes look-up table 704 and the look-up table outputs an increase in SOC_max that is proportionate to the negative road grade amount. Likewise, road μ indexes look-up table 706 and the look-up table outputs a change in SOC_max that is proportionate to road μ. A decrease in road μ decreases SOC_max, whereas an increase in road μ increases SOC_max. Road roughness is input into look-up table 708 and the look-up table outputs a decrease in SOC_max as road roughness increases to reflect that it may be more difficult to store additional charge while using regenerative braking on a rough road. In other examples, the outputs of look-up tables 702, 704, 706, and 708 may non-linear.

The output from look-up tables 702-708 is input to summing junction 710. The output from summing junction 710 is input to limiter 712 which limits the value of SOC_max based on battery temperature. The summing junction 710 implements a decision fusion strategy including but it is not limited to a weighted average, MIN, MAX and etc.

Figure 7B:
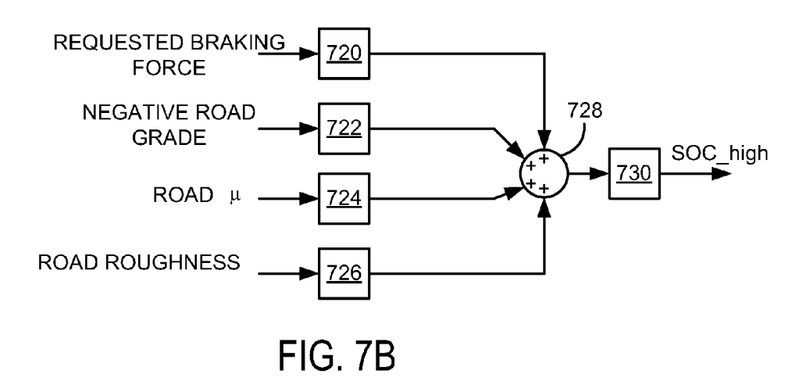
Figure 8A:
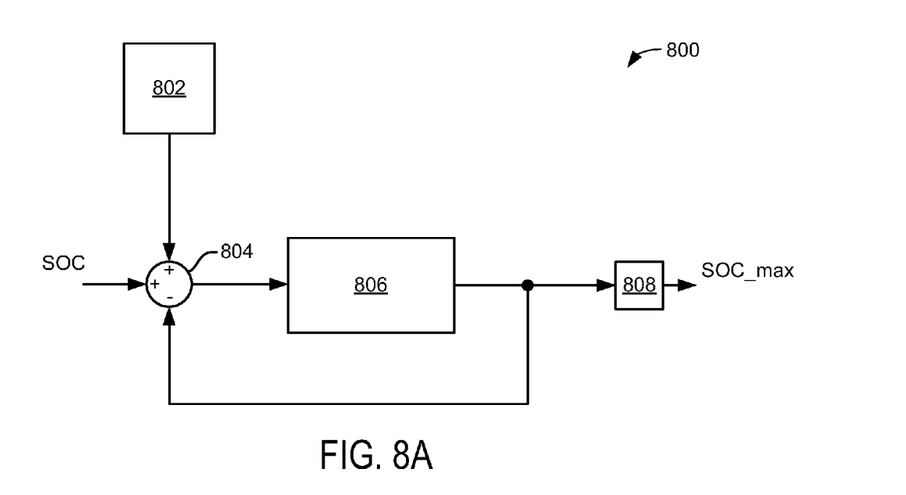
FIG. 8A-8B show block diagrams of a method for decreasing SOC window limits.

Referring now to FIG. 7B, similar to FIG. 7A, requested vehicle braking force, negative road grade, road μ, and road roughness index look-up tables 720-726. Each look-up table 720-726 outputs a SOC_high adjustment that is proportional to the respective table input. In other examples, the outputs of look-up tables 720-726 may non-linear. The outputs from look-up tables 720-726 is input to summing junction 728. The output of summing junction 728 is input to limiter 730 which limits the value of SOC_high based on battery temperature. The summing junction 710 implements a decision fusion strategy including but it is not limited to a weighted average, MIN, MAX and etc.

Thus, FIGS. 7A and 7B show a method for adjusting SOC_high and SOC_max in proportion to requested brake force, road grade, road μ, and road roughness. Further, SOC_high and SOC_max are limited in response to battery temperature.

Another method for adjusting SOC_high and SOC_max according to requested brake force, road grade, road μ, and road roughness is via a rule-based expert system. The expert system can be developed in advance based on apriori knowledge. The inputs to the expert system are requested brake force, road grade, road μ, and road roughness. The outputs are SOC_high and SOC_max. Further, SOC_high and SOC_max are limited in response to battery temperature.

Figure 8B:
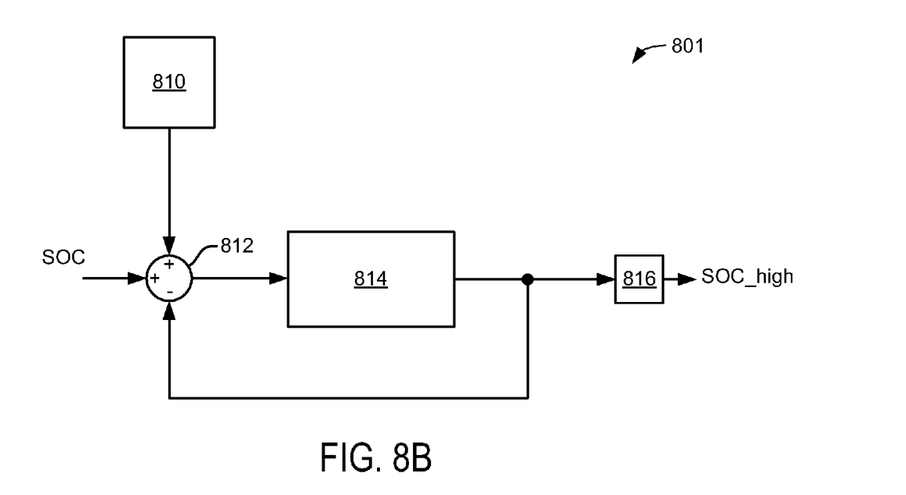
Figure 9:
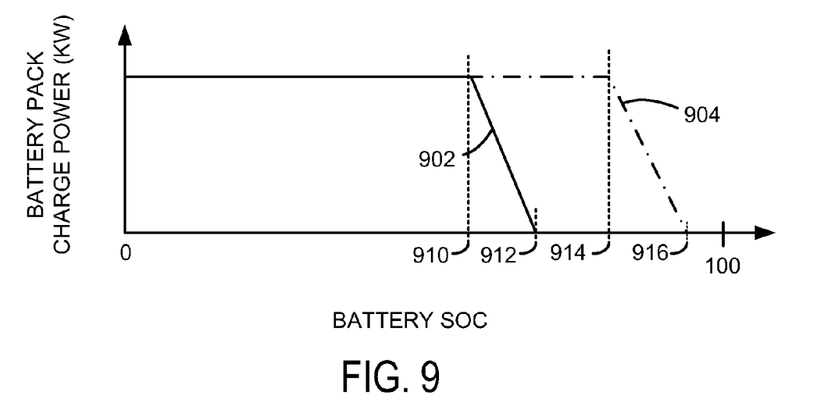
FIG. 9 shows an example plot of SOC window limits.

Referring now to FIGS. 8A and 8B, block diagrams 800 and 801 show two proportional/integral controllers 806 and 814. SOC is input to summing junctions 804 and 812 along with calibration variables 802 and 810. Summing junctions 804 and 812 also receive feedback from the output of proportional/integral controllers 806 and 814. The outputs of proportional/integral controllers 806 and 814 are input to limiters 808 and 816 which limit SOC_max and SOC_high in response to battery temperature. The controllers of block diagrams 8A and 8B are activated when the vehicle transitions from traveling a second or road that has a negative grade to a road that has a positive or zero grade. The scalar of 802 should be greater than zero and the scalar of 810 should be less than zero.

Referring now to FIG. 9, an example plot of SOC window limits SOC_high and SOC_max is shown. The X axis represents battery pack SOC and SOC is an expression of available battery pack capacity. For example, a SOC value of 50 or 50% represents 50% of the battery pack's rated charge capacity is stored in the battery pack. SOC ranges from 0 at the Y axis to 100 at the end of the X axis.

The Y axis represents battery pack charging power for the SOC window limits. The battery pack charging power is an amount of power the battery pack may receive. The battery pack charging power varies with SOC as shown. The battery pack charging power increases in the direction of the Y axis arrow.

Solid line 902 represents the charge power when SOC is between SOC_max and SOC_high for nominal conditions (e.g., no negative grade road and no brake force request). SOC_max for these conditions is at 912. SOC_high for these conditions is at 910. Notice that the battery charging power is reduced from SOC_high at 910 to SOC_max at 912. Therefore, when the battery is charging during nominal conditions, battery charging power is reduced after battery SOC reaches SOC_high at 910. Battery charging power is zero at SOC_max at 912.

Dash-dot line 904 represents the charge power when SOC is between SOC_max and SOC_high for non-nominal conditions (e.g., negative grade road and high braking force). SOC_max for these conditions is at 916. SOC_high for these conditions is at 914. Again, notice that the battery charging power is reduced from SOC_high at 914 to SOC_max at 916. Therefore, when the battery is charging during non-nominal conditions, battery charging power is reduced after battery SOC reaches SOC_high at 914. Battery charging power is zero at SOC_max at 916. Dash-dot line 904 represents an increase in the SOC window limits. Increasing the SOC window limits increases the amount of charge the battery receives and the rate of power the battery receives.

The subject matter of the present disclosure includes all novel and nonobvious combinations and subcombinations of the various systems and configurations, and other features, functions, and/or properties disclosed herein. Further, the described actions, operations, methods, and/or functions may graphically represent code to be programmed into non-transitory memory of the computer readable storage medium in the engine control system.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for operating a battery pack of a vehicle, comprising:
a vehicle including a battery pack; and
a controller including executable instructions stored in non-transitory memory that when executed cause the controller to adjust a first battery pack charging limit to a first battery state of charge and adjust a second battery pack charging limit to a second battery state of charge in response to the vehicle traveling on a section of road having a non-negative grade, adjust the first battery pack charging limit to a third battery state of charge and adjust the second battery pack charging limit to a fourth battery state of charge in response to the vehicle traveling on a section of road having a negative grade, the first battery pack charging limit where reducing a power the battery pack receives toward zero begins, and where the power the battery pack receives continues to reduce until the second battery pack charging limit is reached, the power the battery pack receives reduced to zero at the second battery pack charging limit.

2. The system of claim 1, further comprising additional instructions for increasing a rate of power the battery pack receives, the first battery pack charging limit, and the second battery pack charging limit in response to the vehicle traveling on the section of road having the negative grade, and additional instructions for adjusting a maximum battery state of charge the battery pack may be charged in response to the vehicle traveling on the section of road having the negative grade.

3. The system of claim 2, further comprising additional instructions to limit a highest state of charge the battery pack operates at full charge power in response to a road coefficient of friction, the first and second battery pack charging limits limiting an amount of power the battery pack receives.

4. The system of claim 1, further comprising additional instructions to increase the power the battery pack receives via increasing the first and second battery pack charging limits.

5. The system of claim 4, further comprising additional instructions to decrease the first and second battery pack charging limits in response to a positive or zero road grade.

6. The system of claim 1, further comprising additional instructions for adjusting the first and second battery pack charging limits in response to a battery temperature.

7. The system of claim 1, where the controller is a battery pack controller, and further comprising additional instructions to increase the first battery pack charging limit and the second battery pack charging limit via proportional/integral controllers that are activated responsive to road conditions.

8. The system of claim 1, further comprising additional instructions for communicating a battery state of charge window that varies in response to the vehicle traveling on the section of road having the negative grade to a vehicle controller.

9. The system of claim 1, further comprising additional instructions to adjust the first and second battery pack charging limits in response to a road roughness of the section of road the vehicle is traveling, and further instructions to adjust an amount of power the battery pack may receive in response to the first and second battery pack charging limits.

10. The system of claim 1, where the second battery pack charging limit is a battery pack maximum state of charge limit, and further comprising additional instructions to adjust the battery pack maximum state of charge limit in response to a coefficient of friction of a road the vehicle is traveling on.

* * * * *